INVENTORS
PHILLIP W. SCHUTZ.
EVERITT K. McMAHON
BY
ATTORNEYS.

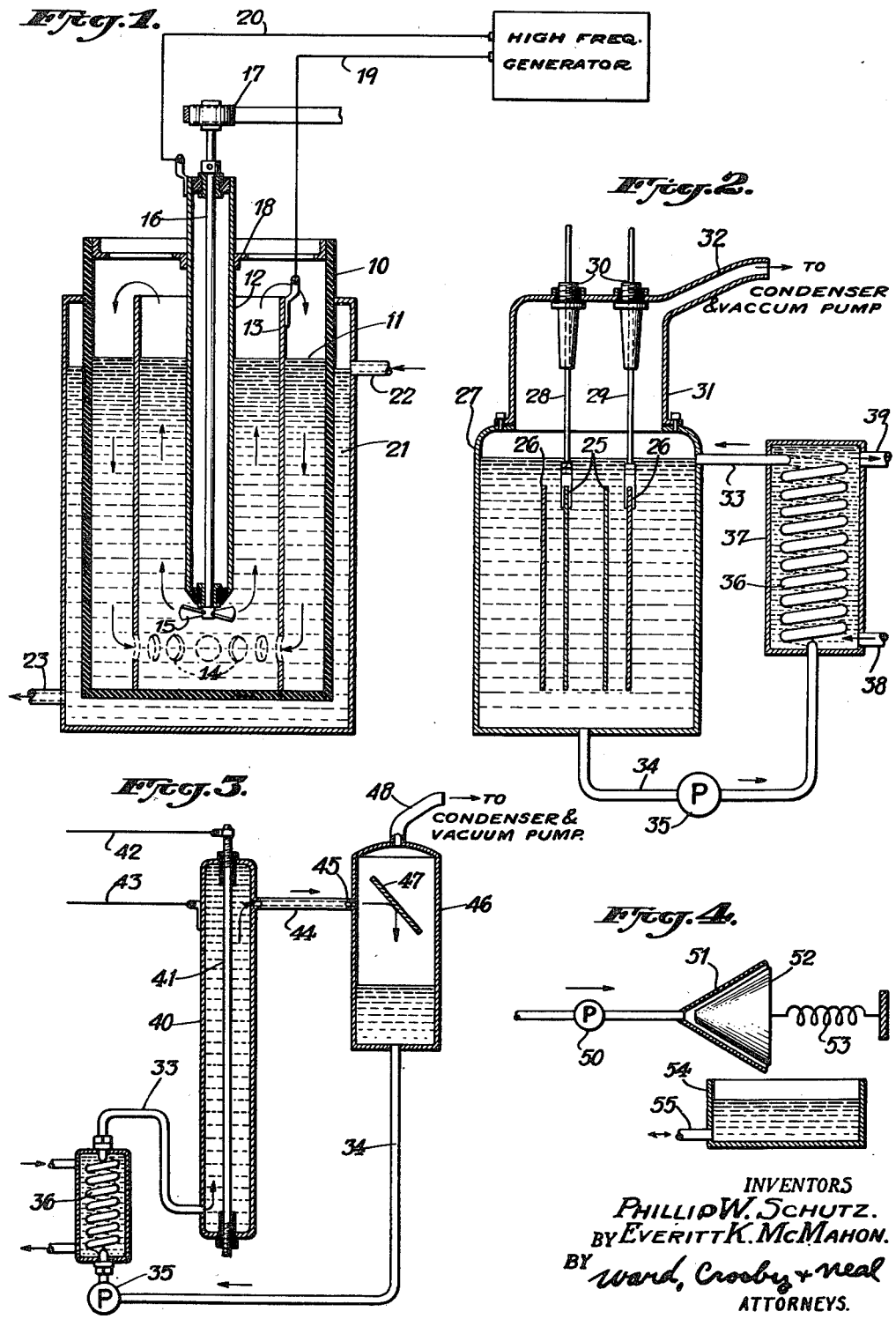

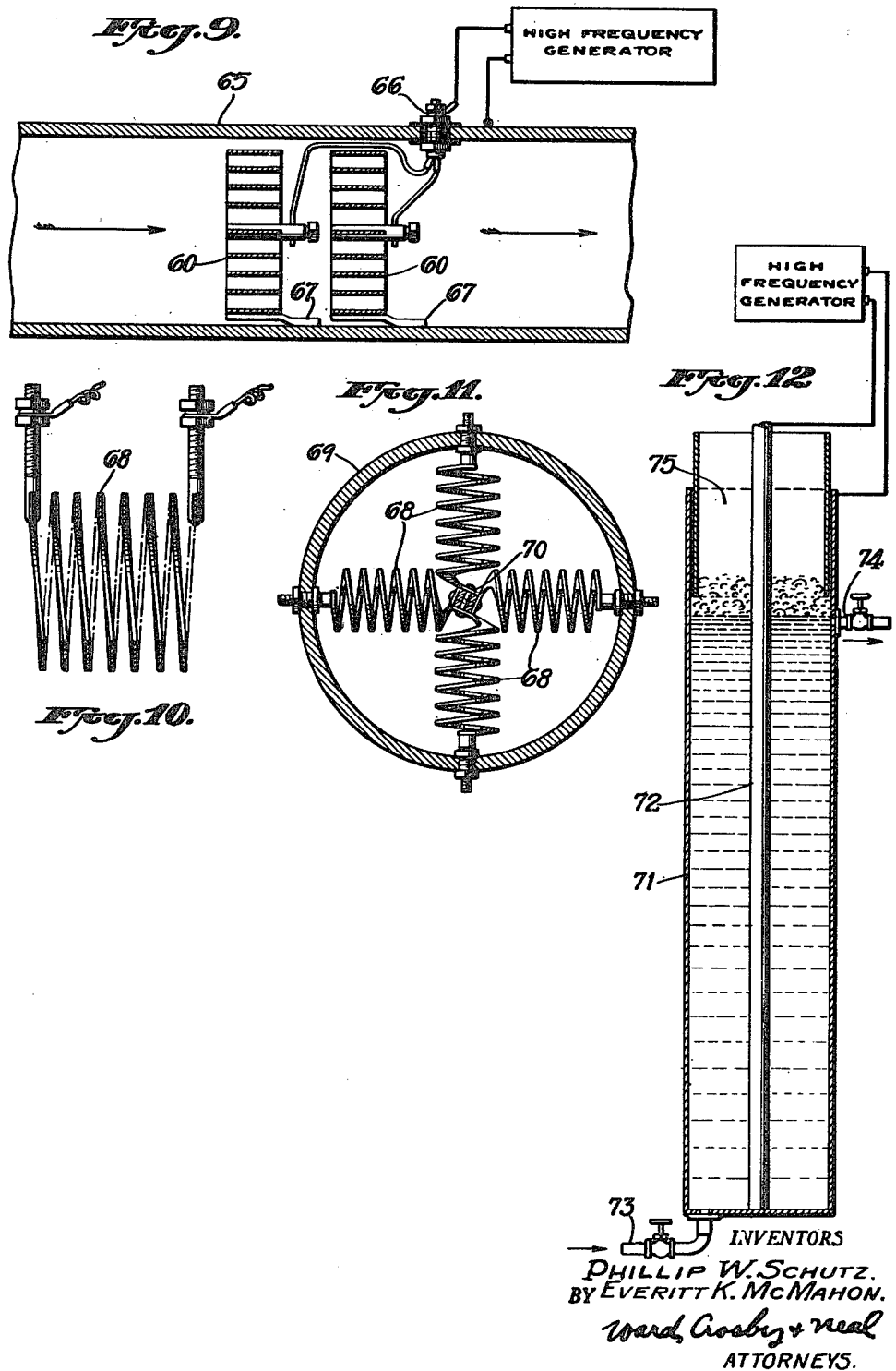

UNITED STATES PATENT OFFICE 2,446,557

DIELECTRIC HEATING OF EMULSIONS

Phillip W. Schutz, Leonia, N. J., and Everett K. McMahon, Jackson Heights, N. Y., assignors to Induction Heating Corp., New York, N. Y., a corporation of New York Application December 30, 1944, Serial No. 570,598

3 Claims. (Cl. 252—346)

This invention relates to methods and apparatus for dielectrically heating emulsions and other liquids, liquid mixtures, pastes, etc., and masses of divided solid material. Among other uses the invention is particularly adapted for heating, drying or breaking down of emulsions. Also according to a preferred phase of the invention, methods and apparatus are provided for dielectrically heating various materials such as above specified by the use of distributed capacity.

In the drying of mixtures such as emulsions or similar materials containing water, it is necessary to first raise the temperature of the water phase to its boiling point at the pressure being used, and then to supply enough heat to the water to vaporize it at its boiling point and thus drive it away.

If this heat is supplied by the usual direct heating methods heretofore available, the success of the process is determined by several factors. For example, if the material is a poor conductor of heat, the process may be very slow even if a high temperature source of heat is applied. Furthermore, in such cases the temperature gradient from the surface inwardly may be great enough to cause overheating or "case hardening" of the surface, or other undesirable and injurious results.

If in addition to being a poor conductor of heat, the mixture contains some material that is heat-sensitive, that fact must be taken into consideration in determining the temperature of the applied heat, and the process must accordingly be carried on more slowly. If the critical temperature is in the neighborhood of the boiling point of the water, the temperature applied must be so low that very little water is vaporized at normal pressures and special vacuum drying processes become necessary.

We have discovered that these difficulties may be minimized or avoided by heating emulsions and similar materials dielectrically, that is, by subjecting same to an electrostatic field maintained by the use of high voltage alternating current of a frequency, for example, in the neighborhood of one million cycles or preferably higher. Most emulsions are formed of materials such that the respective phases thereof may be selectively heated to a fairly pronounced degree. That is, the degree of heating of a dielectric, when subjected to a high frequency electrostatic field, is substantially proportional to the product of the dielectric constant and the power factor of the material, viz., the so-called "loss factor." For example, in a water and oil emulsion, the oil will ordinarily have a low "loss factor," whereas the water will have an exceptionally high "loss factor" due to the fact that its dielectric constant is in the neighborhood of 81 and its power factor is high. This unusual property makes it possible to selectively heat the water in systems such as emulsions, without having to wait for heat conduction through the associated poorly conductive material, also without substantially heating the latter, and without having to apply any hot surface to any part of the material. For example, in the case of a water and oil emulsion, we have found that it is possible to thus selectively heat the water enough to cause a substantial portion or even all of the water to vaporize and boil off before the remainder of the emulsion reaches the boiling point of water. By this method emulsions may be dried in a matter of a few minutes, which heretofore could not be satisfactorily dried without injury or required a long careful and tedious drying process of many hours.

Heretofore it has been the general practice in dielectric heating to place the material to be heated between a pair or pairs of electrodes forming condenser plates to which the high frequency source of current is connected. We have found it possible to treat emulsions and the other materials above mentioned also by using such spaced electrodes immersed therein. However, since the potential gradient is likely to be very high in regions adjacent such spaced electrodes, difficulties may be encountered due to arcing, sparking and sputtering of the liquid around the electrodes. We have found, however, that if instead of using a pair of spaced electrodes, a single continuous or substantially continuous conductor is immersed in the dielectric to be heated and if the conductor is so constructed and arranged as to provide a substantial amount of distributed capacity in conjunction with the dielectric in which it is immersed, then the high frequency current may be applied to the terminals of this conductor with the result that the dielectric material may be heated with surprising rapidity without any arcing, sparking or other difficulties. By the same expedient, bodies of plain water and aqueous solutions may be rapidly and efficiently heated.

Various further and more specific objects, features and advantages of the invention will appear from the description given below taken in connection with the accompanying drawings illustrating by way of example various forms of apparatus for carrying out the invention. The invention consists in such novel features and combinations as may be shown and described in connection with the apparatus herein disclosed, and also such novel methods as are disclosed herein.

In the drawings:

Figs. 1, 2 and 3 are vertical sectional views showing somewhat schematically three forms of apparatus adapted for dielectrically heating emulsions and similar materials in accordance with the invention;

Fig. 4 is a schematic diagram of a mixing or homogenizing arrangement which may be used, for example, with the apparatus of Figs. 2 and 3;

Fig. 9 is a vertical sectional view of one possible arrangement of a coil as of Figs. 7 and 8 within a conduit for the purpose of rapidly heating a stream of fluids, or "fluidized" material flowing therethrough;

Fig. 10 is a view showing an alternative form of coil or conductor which may be used instead of that of Figs. 7 and 8;

Fig. 11 illustrates a possible arrangement of a plurality of coils as of Fig. 10;

Figure 5:
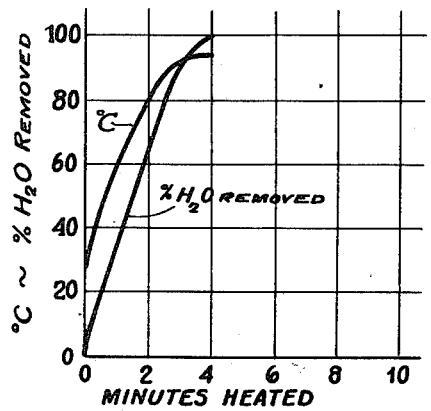
Figs. 5 and 6 are graphs showing the extent to which water may be removed from certain emulsions under various time and temperature conditions.

Fig. 12 diagrammatically illustrates an alternative arrangement for dielectrically heating by the use of distributed capacity.

Referring now to Fig. 1, a vessel is shown at 10 preferably formed of non-conductive material for containing a body of emulsion or the like 11 which is to be dielectrically heated. Within this vessel a pair of cylindrical concentrically positioned electrodes may be provided as at 12 and 13. The electrode 13 may be perforated at its lower portion as at 14 to allow circulation of the liquid, for example, in the direction indicated by the arrows, such circulation being promoted by an impeller as at 15 suitably mounted upon a shaft 16 having insulation bearings within the electrode 12. This shaft may be rotated as by belt and pulley means 17 at its upper end, the belt being connected to any suitable source of power. The inner electrode 12 may be suspended from the top edge of the vessel by suitable frame means 18. The electrodes 12 and 13 may be connected to a suitable known form of high frequency generator as indicated, by conductors 19, 20.

The impeller 15 may be rotated at a suitable speed such as to cause the emulsion to flow up within the electrode 13 and out over the top edge as indicated by the arrows and back down along the annular space between the electrode 13 and the walls of the vessel 10.

In case one phase of the emulsion comprises a material which is subject to destructive decomposition or other injury at a relatively low temperature, the action of the impeller in circulating the emulsion into contact with the relatively cool walls of the vessel 10 will serve to keep the overall temperature of the emulsion down within safe limits while the phase of the emulsion which has a high "loss factor" will be repeatedly brought into close association with the electrodes to insure rapid heating of this phase. To aid in keeping the overall temperature of the emulsion down within safe limits, the vessel 10 may if desired be provided with an external cooling jacket 21 containing a flowing stream of cooling fluid which enters and leaves by way of passages as at 22, 23.

We have discovered that the drying or breaking down of the emulsion may be usually carried on most effectively if the dispersed phase is kept well dispersed and the impeller 15 acting as a stirring or beating device serves to accomplish this purpose.

With the form of construction shown in Fig. 2 a pair of concentric cylindrical electrodes 25, 26 are suspended within a vessel 27 as by terminal connection members 28, 29 which pass out through insulation bushings as at 30 in a hood or cover member 31. This cover may serve to close the vessel from the atmosphere and may be provided with a conduit as at 32 running to a suitable condenser and vacuum pump apparatus for withdrawing and condensing the steam or other vapor which is driven off, and if desired, for maintaining the vessel under a suitable degree of vacuum. This form of apparatus is particularly desirable for drying or breaking up emulsions embodying some material which would be injured at temperatures in excess of some quite low critical temperature, and particularly where it is desired to quickly drive off all or practically all of the moisture without danger of reaching such critical temperature. As shown with this apparatus, the emulsion may be circulated into and out of the vessel 27 through conduits as at 33, 34 forming part of a circuit including a pump 35 and a refrigerating coil 36. This coil may be enclosed in a vessel 37 supplied with cooling fluid entering and leaving through conduits 38, 39. With this apparatus it is apparent that the drying or breaking down of emulsions (such for example as one having a continuous phase formed of a low "loss factor" material, and a dispersed phase formed of a high "loss factor" material), may be accomplished safely at unusually low temperatures due to three conjoint effects, viz. (1) the selective dielectric heating of the high "loss factor" material of the dispersed phase of the emulsion; (2) the vacuum drying effect, and (3) the concurrent refrigeration effect which is particularly effective on the continuous phase of the emulsion.

With the apparatus of Fig. 3, one of the electrodes may comprise a vessel 40 containing the other electrode 41 in the form of a rod mounted in suitable insulation bushings at the ends of the vessel 40, the electrodes being connected as by conductors 42, 43 to the source of high frequency current. As in the case of Fig. 2, the liquid may be circulated through conduits 33, 34, pump 35 and refrigerator coil 36. In this case the liquid or emulsion may flow out of vessel 40 through a conduit 44 having an orifice as at 45 in the form of a spraying orifice, if desired, opening into a chamber 46 provided with a baffle 47. With this arrangement the rotary pump at 35 may force the liquid from the chamber 40 through orifice 45 at a fairly high velocity and against the baffle plate. This causes division of the material into fine droplets affording better opportunity for evaporation. If desired, the upper end of the chamber 46 may as indicated be connected by a conduit 48, to suitable condensing and vacuum pump apparatus.

In Figs. 2 and 3, pump 35 may be generally and preferably in the form of a high speed rotary pump or a gear pump of such construction as to cause fine mixing or homogenizing of the mixture flowing therethrough, for the reason above mentioned in connection with the impeller of Fig. 1. Sometimes, however, the pump may preferably be supplemented by a homogenizing device to obtain the best results. A suitable known form of such device is schematically shown in Fig. 4 where a pump 50 is used to force the liquid into a conical member 51 containing a smooth close fitting conical valve 52 which is normally held seated within the member 51 by pressure of a spring as at 53. The pump thus forces the liquid between the members 51 and 52 which provide a very efficient form of homogenizing device. The homogenized mixture may be collected in a vessel 54 and pumped through conduit 55 into the vessel containing the dielectric heating electrodes.

In tests of the invention which we have performed, we have used a high frequency generator having a capacity of 3½ kilowatts and a frequency variable from about 10 to 30 megacycles, and arranged to apply a high frequency current to the electrodes at about 7500 volts. The curves of Fig. 5 were obtained in treating according to the invention, a water in oil emulsion containing about 5% water and the remainder mineral oil, except for a small amount of soap used in forming the emulsion. In one test for example, about 200 grams of this emulsion were heated using the above-mentioned high frequency generator for about four minutes, during which time various percentages of the water were driven off as indicated by Fig. 5 and at the end of which time all of the water had been driven off. Meanwhile, as shown by the temperature graph in Fig. 5, the overall temperature of the emulsion rose from about room temperature at the start to a final temperature of about 92°. Until the emulsion reached a temperature of nearly 90°, it will be apparent that the water was being continuously driven off in percentage amounts substantially directly proportional to the time of heating, starting within the first few seconds after the initial application of the high frequency current. It will be noted that according to the temperature curve of Fig. 5, the overall temperature of the emulsion also increased rapidly very nearly in direct proportion to the time of treatment until nearly 90% of the water had been removed. Thereafter it will be noted that the dielectric heating effect tapered off rather rapidly, presumably due to the smaller and smaller remaining percentage of high loss factor material present. As shown in Fig. 5, the upper end of the temperature curve rather abruptly merges toward a horizontal line just as the final amounts of water are removed. This illustrates an important advantage of the method, viz., that of automatically discontinuing the further rise in temperature at the moment when the final amounts of water are being eliminated and no further heating is desired. This is particularly important in cases where the low loss phase of the emulsion has a critical temperature above which same might be injured. If this critical temperature is at or above the boiling point of water at atmospheric pressure, the method automatically safeguards the material against overheating. If the critical temperature is at a lower point, then by the use of vacuum equipment as in Figs. 2 and 3, the process may be speeded to terminate with a desired lower boiling point below the desired critical temperature.

The term "overall" temperature as used herein refers to the temperature indicated by a thermometer having its bulb immersed in the emulsion.

Figure 6:
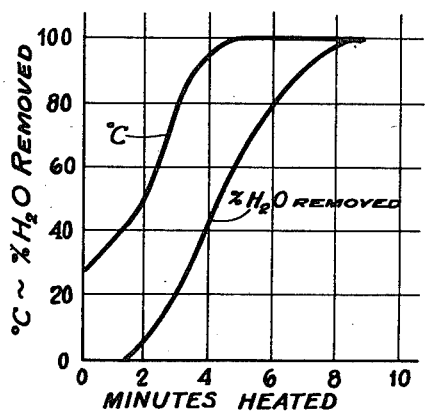

In another test of the invention, results were obtained as indicated in Fig. 6. Here the conditions were substantially the same except that the heating was carried out more slowly by applying less power to the electrodes. As indicated, the power was supplied at a rate such that substantial amounts of the water began to come off after heating for about 1½ minutes and substantially all of the water had been driven off after heating for about 9 minutes. Meanwhile, it will be noted that according to the temperature curve, the temperature rose from about room temperature at the start to about 100° C. after 5 minutes of heating. At this point about two-thirds of the water had been removed. Thereafter during the continued dielectric heating, the overall temperature of the emulsion remained at 100° C. while the remaining third of the water was driven off.

From a comparison of the graphs of Figs. 5 and 6, it will be apparent that with the more rapid heating as of Fig. 5, the evaporation of water tends to be more nearly as efficient in the first few seconds as during the last. Also, as indicated in Fig. 5, with such rapid heating the evaporation starts substantially at once, without awaiting the first measurable increases of the overall temperature. By applying energy at a rapid rate, it is therefore apparent that considerable water may be removed from the emulsion without heating the low loss phase to any injurious temperature, and it is apparent that all of the water or other high loss factor material may be removed without heating the low loss factor material even as high as the boiling point (for the particular pressure being used) of the high loss factor material.

Of course if attempts are made to dry oil and water emulsions such as above referred to by the direct application of heat as from a gas flame, either the time of heating must be very prolonged or difficulties will be encountered due to the bumping, spattering and superheating.

By the dielectric heating method according to the invention, it appears that negligible amounts of water are evaporated until the water phase reaches its boiling point. This is borne out by repeated tests with such emulsions over a gas flame with which in all instances no measurable losses in weight occurred until the overall temperature reached 100° C. On the contrary, with the present invention the water phase very quickly reaches its boiling point, since steam is usually seen in a very few seconds and the loss in weight as above indicated often begins substantially at once.

The occurrence of the principle of "selective heating" of the water phase of the above-mentioned emulsions, is strikingly illustrated by the fact that the mineral oils used could not be readily or rapidly heated dielectrically in the pure state. For example, one oil sample subjected to a very high voltage with substantial amounts of high frequency power was only heated from 23° C. to 54° C. in about 8 minutes.

The invention is useful where it is desired to break emulsions of water and oils. In this process the water droplets are quickly raised to a high temperature and their surfaces ruptured, thus permitting coalescence. In some cases this will occur almost instantly and with a very small overall temperature rise.

While the test results shown by the curves of Figs. 5 and 6 were obtained with water in oil emulsions, the invention is also applicable to the heating, drying or breaking down of oil in water emulsions. The oil in water types, as well as those of the water in oil type having a relatively high water content, break down quite quickly into water and oil layers.

Figure 7:
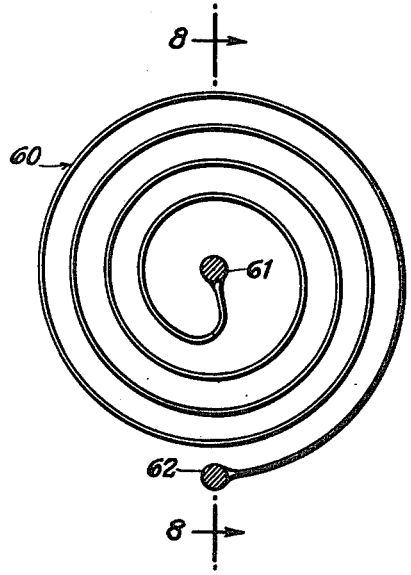
Figs. 7 and 8 are respectively plan and vertical sectional views of a preferred form of coil or conductor which may be used according to the invention for dielectric heating of liquids, pastes, etc., or divided solid material, through the use of distributed capacity.
Figure 8:
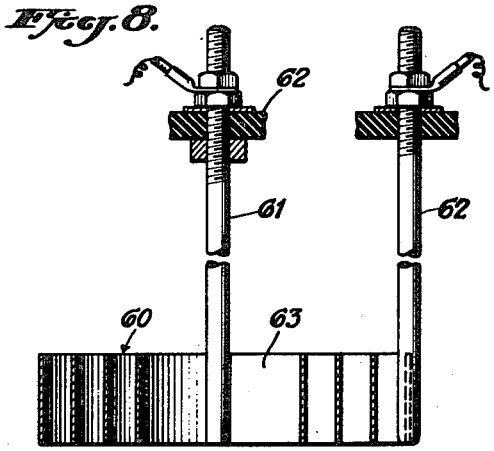

Our tests have indicated that instead of using spaced-apart electrodes as shown in Figs. 1 and 3, it is in many cases preferable to apply the high frequency energy by immersing in the dielectric material to be heated, a continuous conductor element, to the terminals of which the high frequency voltage is applied, such conductor being constructed and arranged to have some effective inductance and a substantial amount of distributed capacity when same is immersed in the dielectric to be heated. One example of such a conductor element is shown at 60 in Figs. 7 and 8, this device for example being adapted to be suspended in place of the spaced electrodes of Fig. 2. As shown in Figs. 7 and 8, the construction may comprise a spiral formed of conductive ribbon material and arranged so that its looped portions form opposed spaced-apart conductor areas providing substantial amounts of distributed capacity in conjunction with the dielectric material interposed between such areas when the device is immersed in the dielectric. As shown, the ends of the spiral conductor element may be soldered to supporting posts or terminal members as at 61, 62, to which the high frequency current may be applied. If desired, the terminal post 61 may be so mounted in insulation supporting means as at 62, as to be rotatable on its axis to thereby "wind up" or partially "unwind" the spiral and thereby adjust the spacing of the turns of the spiral and consequently vary the distributed capacity. Preferably to obtain a maximum feasible amount of distributed capacity with a conductor of given length, and within a given space, several rather closely spaced turns may be provided about a central open space as at 63 (Fig. 8).

Heating elements as of Figs. 7 and 8 making use of the distributed capacity effect will generally have a number of important advantages over the use of the spaced-apart electrodes for the purpose. Since there is a continuous conductor running between the high frequency terminals, arcing, sparking and sputtering of the dielectric fluid or other material in which the device is immersed is eliminated. Also the problems of providing suitable insulation supports which will not break down under the high potentials, are greatly simplified. Guard rings and other shielding precautions usually advisable with spaced electrodes may also be largely dispensed with, since the elements of capacity within the coil are immersed in the dielectric.

Dielectric heating tests with heating elements such as of Figs. 7 and 8 have given highly satisfactory results on a wide variety of dielectric materials, including pure mineral oil, animal and vegetable oils, pure water, oil-water emulsions, granular and powdered dielectric material such as aluminum oxide, etc.

Such a heating element according to our invention has been used for example as a part of calorimeter apparatus for testing the output of a high frequency generator. That is, the spiral coil connected to the high frequency generator may be immersed in a vessel of water having if desired an inlet and outlet. The temperature of the inlet and outlet streams may be measured while the amount of the flow is metered. Consequently, the amount of heat imparted to the water may be accurately determined. With this arrangement minor disturbances or ripples on the surface of the water in the vessel do not materially alter the load on the high frequency generator, since the effective areas providing the distributed capacity remain constantly immersed in the water. For this purpose a spiral coil may be used formed for example of a metal ribbon 1 inch wide, $\frac{1}{16}$ inch thick and so wound as to have three or four turns of from 4 to 5 inches in diameter spaced by $\frac{1}{8}$ to $\frac{3}{8}$ inch. To this coil, for example, high frequency current of from 15 to 30 amperes of 20 megacycles frequency, may be applied with a voltage, say, of 5000 across the terminals.

In one test of such apparatus for the heating of water, about 1000 grams of water were heated from room temperature to 60° C. in 1½ minutes. The load into the work was about 1.9 kw., which increased with temperature. The operation was smooth with complete absence of sparking. It was possible to tune the high frequency circuit sharply with no tendency to go out of oscillation. In another test a volume of wet gum material was successfully dried in a short time with complete absence of sparking and with smooth operation. Other similar tests in the drying of emulsions were likewise successful. A similar trial was made using a saturated solution of salt water. In this case the load on the high frequency generator was less than that experienced under comparable conditions with pure water and there was evidence that the heating done was in considerable part at least due to conduction currents, the salt water acting as a resistance body.

Tests were also made with granular material such as aluminum oxide poured over the coil and it was found that this material could be rapidly heated without any difficulty due to arcing or sparking.

The high frequency current applied to the coil may preferably be of a frequency the same as the natural resonating frequency of the coil when immersed in the dielectric to be heated. It is then of course possible to apply the coil directly to a high frequency transmission line without any accompanying tuning device.

As shown in Fig. 9, coils such as at 60 connected to the high frequency source may be mounted in a coaxial position within a conduit as at 65 carrying a stream of the dielectric fluid or "fluidized" material desired to be heated. In some cases it may be desirable to use two or more of the coils mounted in the conduit and connected in parallel as shown. One of the terminals of the coils as well as one of the terminals of the high frequency generator may be grounded to the conduit, whereas the other connection may be brought into the conduit through a suitable insulation bushing as at 66. The grounded terminals of the coils as at 67 may be secured in any desired manner to the interior surface of the conduit and act as a coil support. This arrangement makes possible very rapid and efficient heating within small spaces, of various dielectric liquids or gases which have a high "loss factor." Also the same arrangement may be used to heat masses of particles of dielectric material which are "fluidized" by being carried along in a stream of liquid or gas through the conduit.

In Fig. 10 a helical form of coil 68 is shown which may be used in generally the same manner as the coil in Figs. 7 and 8. This form may be made of a flat ribbon whereby the opposed surface areas of successive turns or loops provide substantial amounts of distributed capacity in conjunction with the dielectric material in which the coil may be immersed.

Fig. 11 shows an arrangement according to which several of the coils as of Fig. 10 may be connected electrically in parallel and mounted within a ring member 69. Here the outer terminal of each coil is connected to the ring 69 to which one high frequency connection is applied, and the inner ends of the coils are connected together or to a central terminal 70 to which the other high frequency terminal is applied. This whole assembly may be immersed in the dielectric material to be heated.

Another form of heating element making use of distributed capacity for dielectric heating, is shown in Fig. 12 comprising a vessel 71 of conductive material within which a central electrode 72 is mounted with its lower end in electrical contact with the bottom of the vessel. Liquid to be heated may be conducted into this vessel through a valved inlet as at 73. The heated or treated liquid, or the portion thereof which has not been evaporated, may pass out through a valved outlet 74. As shown, the terminals of the high frequency generator may be connected respectively to the wall of vessel 71 and the rod 72. With this arrangement distributed capacity is provided between the inside walls of the vessel and the rod 72 in conjunction with the dielectric liquid or other material within the vessel, whereby the arrangement may be operated as a resonant column. The desirable height of the vessel may be determined by calculation so that the natural frequency of the assembly will correspond to one-quarter wave length for example, of the high frequency supply. With a frequency of 20 megacycles and with the device filled with water, for example, the vessel may be approximately 16 inches in height. The potential between the central rod and the vessel, and to which the liquid is subjected, starts from zero at the bottom and increases approximately according to a sine wave to a maximum at the surface of the liquid when the surface of the liquid is at or below the quarter-wave length. When the liquid level is above the quarter-wave length the maximum voltage occurs at the quarter-wave length and drops off toward the surface. Consequently with this arrangement the dielectric heating effect may be made to increase rapidly in regions at or near the surface of the liquid, as desired, and near the outlet as shown. For this reason the arrangement has advantages for the heating and drying of emulsions, particularly those in which foaming may occur. That is, the foaming due to the driving off the high loss factor phase of the emulsion will be confined to the upper region of the body of liquid where the vapor is free to quickly pass off and where the emulsion is more nearly in its dried condition. Thus excessive foaming is minimized. Also very rapid heating at the surface region of the liquid is made possible without excessive agitation and spattering since the vapor is free to immediately pass off from the upper hottest regions.

In order to adjust the height of the liquid column to correspond to one-quarter wave length of the high frequency source, either the inlet and outlet valves may be regulated or to obtain an approximately equivalent effect, the vessel 71 may be provided with a telescoping extension piece as at 75 within its upper end, this piece being slidably adjustable vertically to give the system the desired amount of distributed capacity depending upon the character of the liquid emulsion or other dielectric material contained in the vessel.

Alternative embodiments of the invention are disclosed in applicants' co-pending application Serial No. 627,350, filed November 8, 1945.

While the invention has been described in detail with respect to certain preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent is:

1. Apparatus for dielectrically heating fluids and fluidized materials having dielectric properties, comprising: a ribbon-like conductive strip shaped in the form of spaced convolutions, with surfaces of the wider dimension of one convolution facing surfaces of the wider dimension of another to thereby form opposed, spaced-apart conductor areas having a substantial amount of distributed capacity therebetween, means for so energizing said metal strip from a high voltage high frequency source as to cause current to flow therein, and enclosure means for the material, in which enclosure means such convolutions are mounted for immersion in the material whereby the material forms a dielectric between said conductor areas.

2. Apparatus for dielectrically heating fluids and fluidized materials having dielectric properties, comprising: a member of sheet-like conductive material generally spirally wound, with surface areas of one convolution facing surface areas of another to form extensive spaced apart conductor areas having a substantial amount of distributed capacity therebetween, means for connecting a source of high voltage high frequency current to flow between two points on the spiral which are separated by one or more convolutions, and enclosure means for the material, in which enclosure means said member is mounted for immersion in the material whereby the material forms a dielectric between said conductor areas.

3. In the drying and breaking down of emulsions which include a liquid subject to injury at a predetermined temperature: the method comprising the steps of subjecting a flowing stream of the emulsion to an electrostatic field of high frequency established between conductive surfaces over which the stream flows, said field being maintained with sufficient intensity to cause by dielectric heating a temperature in one phase of the emulsion sufficient to evaporate same, and subjecting said stream to homogenizing action to maintain the dispersed phase of the emulsion in well-dispersed condition as it passes through said field.

PHILLIP W. SCHUTZ.
EVERETT K. McMAHON.

REFERENCES CITED

The following references are of record in the file of this patent:

UNITED STATES PATENTS

| Number | Name | Date |
| --- | --- | --- |
| 1,464,782 | Stubbs | Aug. 14, 1923 |
| 1,520,501 | Kohn | Dec. 23, 1924 |
| 1,522,188 | Hull | Jan. 6, 1925 |
| 2,344,754 | Vang | Mar. 21, 1944 |
| 2,364,526 | Hansell | Dec. 5, 1944 |
| 2,374,515 | Walton et al. | Apr. 24, 1945 |

FOREIGN PATENTS

| Number | Country | Date |
| --- | --- | --- |
| 301,930 | Great Britain | Nov. 28, 1929 |
| 505,389 | Great Britain | May 10, 1939 |
| 690,342 | France | June 16, 1930 |